Dec. 23, 1958 I. MOLNAR 2,866,004

ELECTRONIC BUSY TEST CIRCUIT

Filed March 4, 1954

4 Sheets-Sheet 1

INVENTOR.
IMRE MOLNAR

BY Wm. Walter Owen

ATTY.

Dec. 23, 1958

I. MOLNAR 2,866,004

ELECTRONIC BUSY TEST CIRCUIT

Filed March 4, 1954

4 Sheets-Sheet 2

INVENTOR.
IMRE MOLNAR

BY Wm. Walter Owen.

ATTY.

Dec. 23, 1958 I. MOLNAR 2,866,004

ELECTRONIC BUSY TEST CIRCUIT

Filed March 4, 1954 4 Sheets-Sheet 3

300

INVENTOR.
IMRE MOLNAR

BY Wm. Walter Owen

ATTY.

INVENTOR.
IMRE MOLNAR
BY Wm. Walter Owen.
ATTY.

United States Patent Office 2,866,004

Patented Dec. 23, 1958

2,866,004

ELECTRONIC BUSY TEST CIRCUIT

Imre Molnar, Chicago, Ill., assignor to General Telephone Laboratories, Incorporated, a corporation of Delaware Application March 4, 1954, Serial No. 414,166

13 Claims. (Cl. 179—18)

The present invention relates in general to telephone systems and in particular to a test and associated circuits for connector switches. An electronic busy test circuit is associated with a connector switch for enabling the switch to be utilized in conjunction with an automatic telephone system subscriber, a manual telephone system subscriber and with some modifications for the purpose of providing additional services in a private branch exchange.

Much difficulty is presented in the conversion of manual telephone systems to automatic telephone systems, as the line circuit of the automatic subscriber as a rule maintains a —48 volt potential to indicate an idle condition while the line circuit of the manual subscriber maintains a ground condition to indicate an idle condition. As the line cut-off relay of the manual subscriber is generally of low ohmage it is not possible to apply a full —48 volt battery to the line cut-off relay of the manual subscriber. However, by providing a —24 volt battery to the line cut-off relay of the manual subscriber as shown in Patent No. 2,386,130 issued to Mahoney, October 2, 1945, it is possible to prevent the excessive flow of current through the line relay while allowing the test of the idle condition to be performed by the same equipment used in an automatic system. Ground potential or near ground potential will indicate a busy condition for both types of subscribers and as explained in the aforementioned patent, ground potential is furnished from the connector switch on a call by an automatic subscriber and through the sleeve relay of the operator's cord circuit on a call from a manual subscriber to indicate a busy condition. As the latter ground is not a direct ground such as generally provided from the connector switch on an automatic connection, the test for the line condition is further complicated. Prior to this time the answer to these problems has involved numerous circuit changes which are expensive and complicated whereas the present invention enables a busy condition or an idle condition to be determined automatically by comparatively simple circuit adaptions over a wide range of values for either condition.

Therefore one of the objects of the present invention is to provide an electronic test circuit for a connector switch.

Another object of this invention is to provide a test circuit for a connector switch whereby the condition of a subscriber's line may be determined over widely differing values ascribed to a particular line and for different lines.

Accordingly, among the features of this invention are the circuit arrangements for testing the condition of a called line; the circuit arrangements for assigning a test circuit to a particular connector; the means and circuit arrangements for testing the conditions of a particular test circuit for the purpose of determining the condition of the test circuit and the circuit arrangements for allowing a number of lines or trunks to be tested in sequence.

Figures 1, 5:
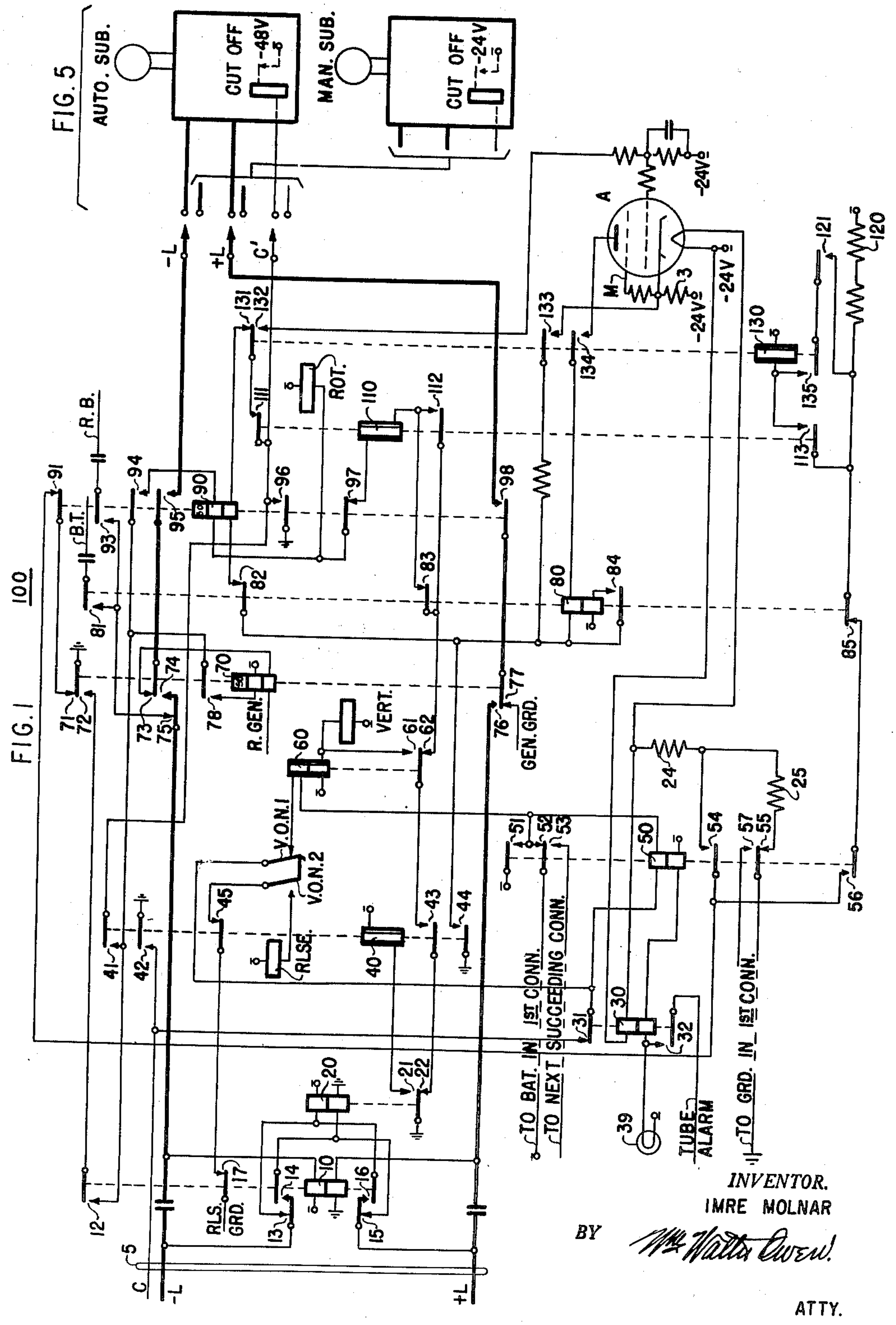

Referring to the drawings, Fig. 1 is an embodiment of the present invention showing a connector circuit 100 and an electronic detector test circuit individual thereto.

Figure 2:
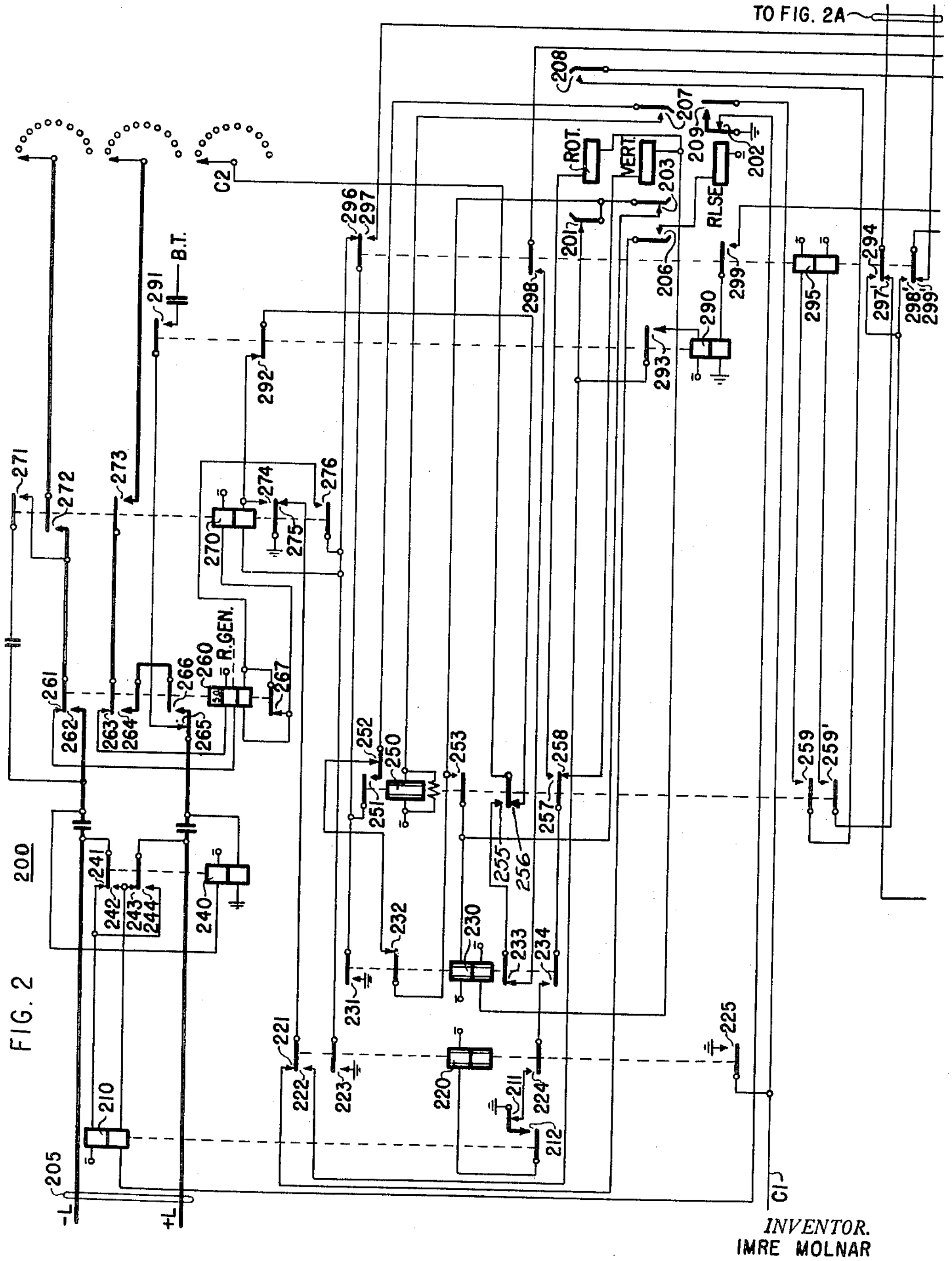
Figure 3:
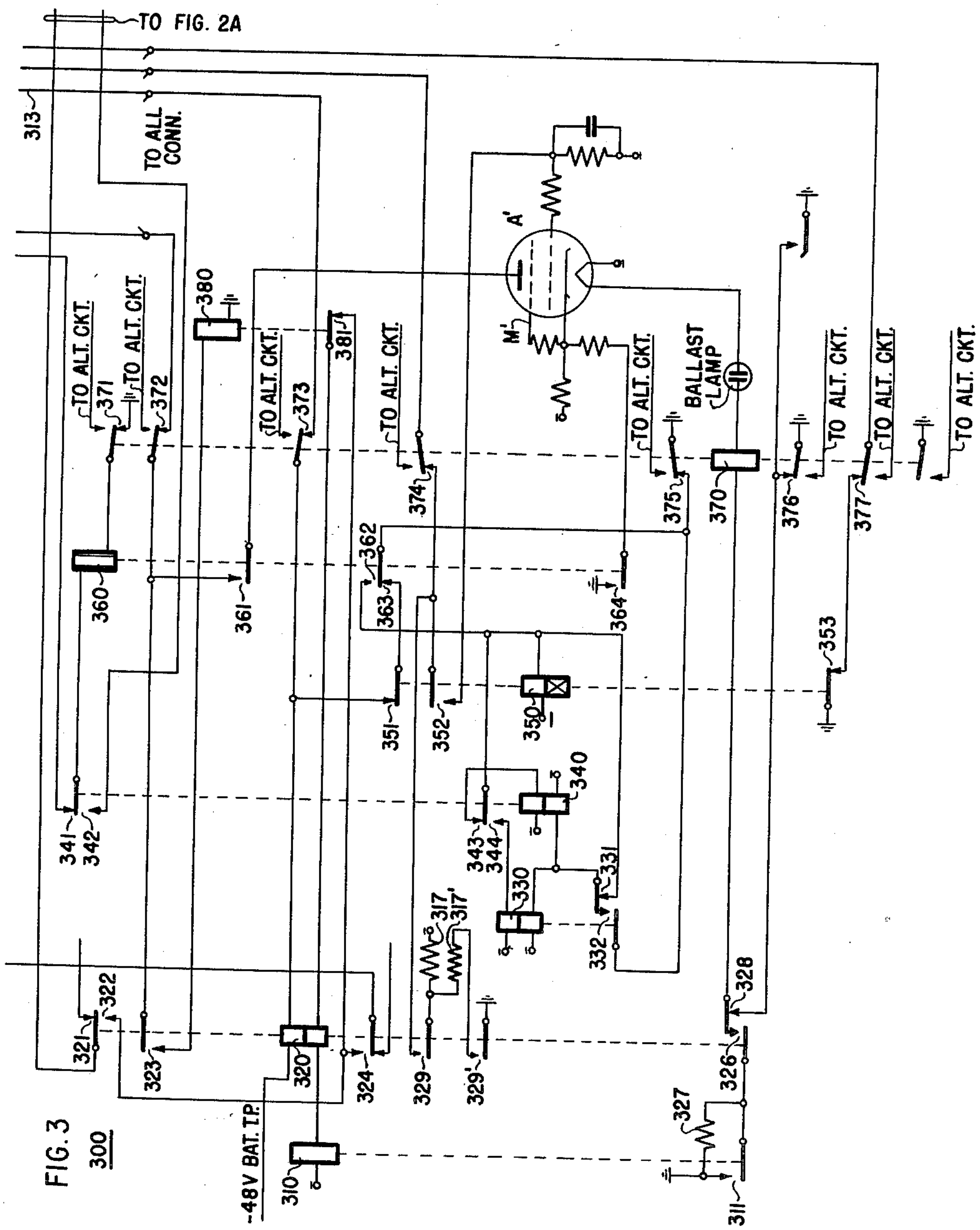
Figures 2A, 4:
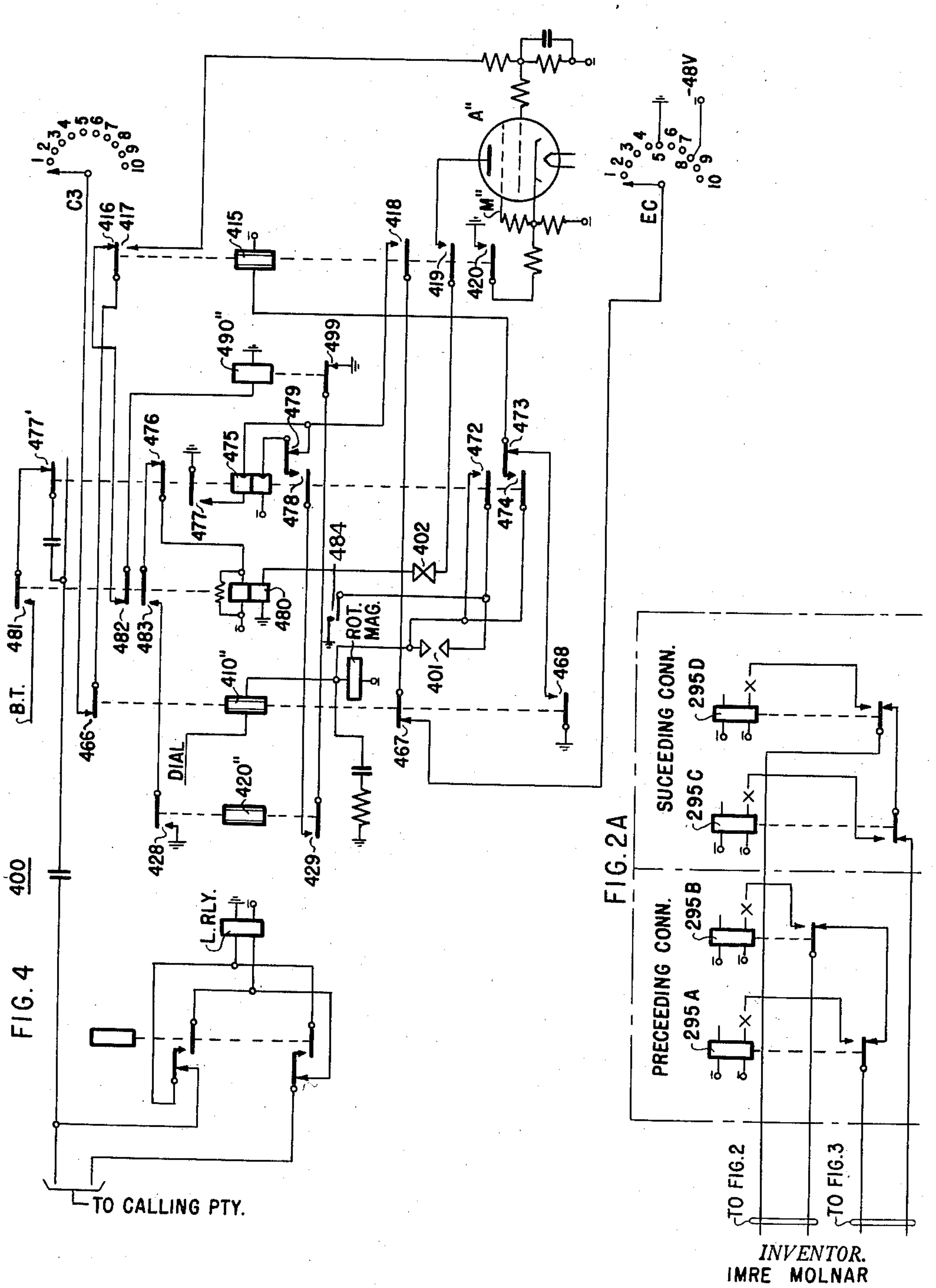

Figs. 2 and 3 comprises another embodiment of the invention showing the circuit arrangements for a connector circuit 200 and an electronic detector circuit 300 common to a number of connectors, while Fig. 2*a* is a schematic of the chain circuits associated with a number of connectors.

Fig. 4 shows an electronic test circuit for use with a trunk hunting connector circuit 400, which may be employed in a private branch exchange. Certain parts of the trunk hunting connector are different than that shown in Fig. 1, while other apparatus similar to that shown in Fig. 1 are designated by *a''*.

Fig. 5 shows a manual subscriber's line circuit and an automatic subscriber's line circuit in block form of the types described in the aforementioned patent. The manual subscriber has —24 volt battery connected to one side of the cut-off relay while the automatic subscriber has —48 volt battery connected to the cut-off relay. The line circuits shown in Fig. 5 are the type described in conjunction with the three modifications described herein.

The invention is illustrated herein as applied to a well-known Strowger step-by-step system although it may readily be adapted to other types of systems. Such a Strowger system together with the construction and circuit diagrams of the various switches are disclosed in a publication by Hershey entitled Automatic Telephone Practice, 6th edition, copyright 1949. In the Strowger system, a connection is set up responsive to a dialling operation by the calling subscriber which causes one or more selector switches and a connector switch seized by a selector switch to extend a connection from the calling line to the called line. The connector is provided with means including testing circuits which determine if the called line is busy or idle and which prevent the completion of the connection if the called line is engaged.

The connector switch circuits 100 and 200 shown in the first two embodiments are contemplated for use in establishing connections to both automatic and manual subscribers of the type illustrated in the aforementioned patent. A manual subscriber, when idle, has —24 volt battery connected through his cut-off relay to the bank contacts associated with the private wiper of the connector while the automatic subscriber has —48 volt battery connected thereto as illustrated in Fig. 5. In a busy condition each will have ground or near ground potential connected to the bank contact associated with the private wiper. The connector switch shown in the third embodiment is similar to that shown in the first embodiment with the exception that it has a fourth or EC wiper and it is arranged to perform a trunk hunting operation among a group of trunks associated with a certain dialled number in addition to the regular idle and busy tests necessary for other dialled numbers.

After a connector is stepped to a desired position the private switch wiper is momentarily connected to the grid of a thyratron tube such as a 2050 represented by tubes A, A' and A'' in Figs. 1, 2 and 4 respectively. The circuit constants of this tube are so arranged so that this tube will not fire on finding the described negative potential indicating an idle line. In practice, the grid, cathode and filament batteries are each —24 volts while the plate is at ground potential. In this condition the tube does not fire. If however ground or near ground potential is found indicating the line is busy the grid of the tube will accordingly become more positive and the tube fires to in turn operate a control relay. This control relay in turn returns busy tone to the calling party.

It will be understood that the connector shown in each modification is one of a group of connectors accessible to a group of selectors. In the first embodiment each connector has an electronic test circuit individually associated therewith. As the connectors are generally called into use in sequence and as the time between which the connector is seized and when the test of called line must be performed is short, a prewarming circuit for the tube filament is arranged through a chain circuit from the first connector as disclosed in Fig. 1. As the particular connector is seized it completes its own circuit for heating the tube while forwarding the prewarning chain circuit to the next connector.

In the second embodiment only one test circuit or detector is provided for a group of connectors exclusive of the alternate detector (not shown) which is called into operation on failure of the first. To equalize the availability of this detector to all connectors in the group, a chain circuit is provided extending through several connectors as shown in Fig. 2*a* designated as preceding connectors and another chain circuit is provided extending through the several connectors designated as succeeding connectors. A connector such as 200 seizes the detector on operation of relay 295 which in turn completes a circuit for its lower winding over the chain while opening both chains. If one of the preceding connectors seizes the detector, the detector disconnects the chain through the preceding connectors and connects the chain through the succeeding connectors and after seizure by one of the succeeding connectors the detector is again made available to one of the preceding connectors.

Seizure of the detector by successive members of either the preceding or succeeding connectors is not prevented as the described alternate operation takes place only if a connector is waiting to seize the detector. Otherwise the detector may be seized by connectors of either group in succession, as a detector routing check circuit used for checking the chain circuits while the detector is idle checks each chain alternately, to thereby enable either of the chains at any particular time for seizure by any waiting connector.

In the third embodiment the connector switch 400 is arranged to test both the idle and busy condition of an individual line of either an automatic or a manual subscriber in a manner similar to the first or second embodiments and also tests the condition of a group of lines or trunks which are accessible to the switch on the dialling of a certain number. The electronic test circuit is shown as individual to the connector 400, however it should be understood that it may be arranged common to a number of connectors as shown in the second embodiment and with a prewarming circuit as shown in the first embodiment. Such a group is indicated by the bank contacts 5—8 associated with the private wiper EC of this embodiment. The first contact 5 of the group has ground connected thereto; 6 and 7 are open and 8 has —48 volt battery connected thereto. If the connector finds the line or trunk associated with contact 5 busy it will automatically be stepped over the bank contacts 5—8 until an idle trunk is found.

Referring now to Fig. 1 and assuming a battery searching selector switch in hunting for an idle connector finds battery on the bank contact of connector 100 associated with the C lead initially over the C lead, contacts 31, V. O. N. contacts 1, upper winding of relay 60, contacts 52 to negative battery over a chain leading to the first connector switch in the group. A parallel circuit to negative battery is also formed through the lower winding of relay 50 and contacts 52. Relays 50 and 60 operate from ground in the selector switch extended to the C lead while the selector switching relay is operated. The line relay 20 of the connector switch is operated in any well-known manner on completion of the loop by the selector switching relay from —L line of loop 5, contacts 13, to battery through the upper winding of relay 20 on one side and from +L line of loop 5, contact 15 to ground through lower winding of relay 20. Relay 20 operates and closes contacts 21 to complete an obvious circuit to relay 40. Slow-to-release relay 40 operates to close contacts 41—44 and open contacts 45. Closing of contacts 42 now sends ground back over the C lead to hold the preceding switch and furnishes a new ground for holding relays 50 and 60 operated. Opening of contacts 45 opens a point in the circuit to the release magnet of the connector switch.

Previously operated slow-to-release relay 60 closes contact 61 to prepare a stepping circuit to the vertical magnet of the connector switch and a circuit for its own lower winding. Relay 50 closes contacts 51 to complete holding circuits through its own lower winding and the upper winding of relay 60 respectively and at contacts 53 completes a point in the chain for forwarding battery from the first connector switch to the succeeding switch and opens the original operating circuit for itself and relay 60 at contacts 52.

A prewarming circuit extending from —24 volt battery through the filament of tube A in parallel with the upper winding of relay 30 and then through resistances 24 and 25, and contacts 55 through a chain to ground in the first connector switch is broken when contacts 55 open but a ground for the above circuit is furnished through contacts 54 now closed and contacts 91 and 71 to thus shunt resistor 25. Thus the tube filament which is preheated on completion of the first circuit by a preceding connector is maintained heated. The initial preheated circuit includes resistor 25 to reduce current consumption and preserve the life of the tube. At contacts 57 the chain from ground in the first connector switch is extended to provide ground for the filament of the tube in the succeeding connector. At contact 56 ground is furnished from contacts 71 and 91 and over contacts 85 to bimetal thermal relay 120. Relay 120 is adjusted not to operate until the tube has had sufficient time to heat and the busy test operation is completed.

On the first pulse of the first digit dialled into the connector switch 100, relay 20 releases to close contacts 22 and complete an obvious circuit for energizing the lower winding of relay 60 and the vertical stepping magnet over contacts 22, 43 and 61. The connector is now stepped by the vertical stepping magnet in accordance with the dialled digit. On the first step contacts V. O. N. 1 open and contacts V. O. N. 2 close to prepare a circuit to the release magnet. Contacts V. O. N. 1 open to break the previously described circuit through the upper winding of relay 60. The lower winding of relay 60 holds its contacts operated during the dialling of the digit. At the end of the digit contacts 22 remain open and the lower winding of relay 60 and the vertical magnet deenergize. Relay 60 releases to close contacts 62 and prepare a stepping circuit to the rotary magnet and relay 110.

On the first pulse of the second digit dialled, contacts 22 again close and a circuit is now completed over contacts 22, 43, 62, 83, through the winding of slow-to-release relay 110, contacts 97 to battery through the rotary magnet. Relay 110 operates and opens contacts 111 and closes contacts 112 to complete a holding circuit over contacts 62, 43 and 22. At contacts 113 a circuit is completed to slow-to-release relay 130 from ground at contacts 71 over contacts 91, 56, 85 and 113. Relay 130 at contacts 135 completes its holding circuit over contacts 121, contacts 85, 56, 91 and 71. At contacts 132 it prepares a point in the circuit for connecting the grid of tube A to the private wiper C′. At contacts 133 it completes a biasing circuit for the cathode and grid M of tube A, from battery over resistance 3, contacts 133, to ground at contacts 44. Ground potential is applied from contacts 44, upper winding of relay 80 and contacts 134 to the plate of tube A to prepare the tube for operation. As the private switch wiper C′ is stepped over its associated contacts during the dialling of the second digit it encounters a potential on each contact which is of no effect as contacts 111 are open.

At the end of the digit contacts 22 remain open and relay 110 and the rotary magnet deenergize. Contacts 113 open but relay 130 is held operated over its previously described holding circuit. Closing of contacts 111 connects the private wiper C′ and the bank contact associated therewith to the grid of tube A over contacts 132. If the called line is busy, ground or near ground potential is found on the contact associated with the private wiper to thus raise the potential on the grid of the tube A connected to the private wiper sufficiently for the tube to fire. When the tube fires a circuit is completed through the tube, previously closed contacts 134, the upper winding of relay 80, to ground on contacts 44. Relay 80 operates and applies busy tone to the loop back to the calling party over contacts 81 and 75. At contacts 82 a point is opened in an incomplete circuit through the lower winding of relay 90. At contacts 83 a point is opened in the operating circuit of restored relay 110 to prevent its reoperation on release of relay 20. At contacts 84 a holding circuit is completed for relay 80 over contacts 44. At contacts 85 the circuit to relay 130 and bimetal relay 120 is opened and relay 130 releases to in turn open contacts 132—135 and close contacts 131. The calling party on hearing the busy tone may replace his handset to break the loop to relay 20.

Release of relay 20 opens the circuit to relay 40 which restores. Restoration of relay 40 completes a circuit from release ground over contacts 17, 45, V. O. N. contacts 2 to operate the release magnet which in turn restores the connector switch to normal position to thus open V. O. N. contacts 2 and close V. O. N. contacts 1. Release of relay 40 opens contacts 42 to remove the holding ground from the preceding selector switch and it releases while at contacts 44 the circuit to relay 80 and tube A is opened. Relay 80 on releasing does not reoperate relay 110 as relay 40 has released. Neither the lower winding of relay 50 nor the upper winding of relay 60 are operated on restoration of the switch as contacts 42 are opened and the selector switch does not furnish ground. Release of relay 50 opens the operating circuit for bimetal relay 120 and relay 130.

If the bimetal relay operates before the calling party replaces his handset, relay 130 will release as contacts 121 open. The busy ground then forwarded from wiper C′, contacts 111 and 131 will not have any effect however as contacts 82 are open. The circuit to the grid of tube A is opened at contacts 132 while the tube is rendered non-conductive on opening of contacts 134. Relay 80 releases when relay 40 is released as before described.

If the private wiper C′ finds −48 volt battery through the cut-off relay of an automatic subscriber's line circuit, the tube will fail to fire. This is also true if the wiper finds −24 volt battery through the cut-off relay of a manual subscriber. Adjusted bimetal relay 120 operates shortly after the wiper comes to rest and opens contacts 121 to open the holding circuit to relay 130 which releases to close contacts 131 and forward negative battery from the particular called subscriber's cut-off relay as shown in Fig. 5, over contacts 111, 131, the lower winding of slow-to-operate relay 90, contacts 82 and 44 to ground. Relay 90 operates after a period of time to close contacts 91, 93—96 and 98 and open contacts 91 and 97. Opening of contacts 91 opens the circuit to the filament of tube A; the circuit through the upper winding of relay 30; a point in the already opened circuit to relay 130 and the circuit to relay 120. At contacts 93 ring back tone is sent back over contacts 75 and the loop to inform the calling party that the called party is being rung. At contacts 96 ground is applied to the private wiper C′ to operate the cut-off relay of the called subscriber and to busy the line to other connector switches. Simultaneously, a circuit is completed for the upper winding of relay 90 as follows: ground at contacts 96, contacts 41, 94, upper winding of relay 90 to battery through the rotary magnet. Ringing current is applied to the loop to the called subscriber through the lower winding of slow-to-operate relay 70, contacts 73 and 95 on one side and contacts 77 and 98 on the other side.

When the called party answers a D. C. loop is completed and relay 70 is operated from battery imposed on the ringing circuit, contacts 73 and 95, the loop to the called party, contacts 98 and 77 to ground. Relay 70 closes contacts 74 and 76 to complete the loop to relay 10 and opens contacts 73, 75 and 77 to cut-off ringing current and ring back tone. The upper winding of relay 70 is operated from ground at contacts 96, contacts 41 and 78 to battery through the upper winding of relay 70. Closing of contacts 72 prepares a holding circuit for the upper winding of relay 70 which is completed on operation of relay 10. At this time a loop is completed to relay 10 on one side from ground through the lower winding of relay 10 over contacts 76, 98, the loop to the called party and contacts 95 and 74 to battery through the upper winding of relay 10. Relay 10 operates to close contacts 14 and 15 to reverse battery on the loop 5 to provide answer supervision. At contacts 17 it opens a point in the incomplete circuit to the release magnet. At contacts 12 a circuit to the upper winding of relay 70 is completed over contacts 72, 12 and 78. The parties may now converse.

The filament circuit of tube A is arranged in parallel with the upper winding of relay 30 so that if the filament should become opened, the increased current passing through the upper winding of relay 30 operates its contacts to complete circuits for the upper winding of relay 50, the lower winding of relay 30 and the tube failure lamp 39 over contacts 32 and the tube alarm circuit. Lamp 39 on lighting indicates the faulty tube of the group. Opening of contacts 31 prevents seizure of the connector by a battery searching selector while relay 50 in closing contacts 53 and 57 forwards seizing battery and filament ground respectively to the next connector. A circuit will also be completed to bimetal relay 120 for no purpose. Replacement of tube A and temporary removal of ground from the tube alarm circuit permits restoration.

On termination of the conversation and release of the connection by the called party, the circuit to relay 10 is opened so it restores to return battery on the loop 5 to normal to give the calling party a disconnect signal. Closing of contacts 17 prepares the circuit to the release magnet while opening of contacts 12 opens a described circuit for the upper winding of relay 70 which however is held over contacts 41 and 96. The calling party on receiving the disconnect signal replaces his handset to open the loop 5 to relay 20 which releases to in turn release relay 40 as described. Relay 40 on releasing closes contacts 45 to complete a circuit to the release magnet while at contacts 42 ground is removed from the C lead to allow the preceding switch and the lower winding of relay 50 to restore all as described. Opening of contacts 41 releases the upper winding of relays 70 and 90 and they restore. The release magnet restores the switch 100 and the off-normal springs.

If the calling party disconnects, before the called party, relays 20, 40 and 50 restore, while relay 10 maintains the upper winding of relay 70 operated over its previously described circuit and the upper winding of relay 90 is held operated from battery through the rotary magnet, upper winding of relay 90, contacts 94, 12 and 72. Thus when the called party opens the loop to relay 10 and it restores; relays 70 and 90 will restore and the release magnet is operated to restore switch 100 to normal.

An explanation will now be made of the second embodiment of the present invention involving a detector circuit common to a number of connectors. The operation of the preceding switches including an absence of ground searching selector being well understood, only the operation of the connector will be discussed. When the selector hunts for an idle connector and finds an absence of ground it terminates the movement of its wipers and on operation of its switching relay a loop is completed from battery through the upper winding of relay 210, contacts 241 over the −L line of loop 205 and on the other side over the +L line of loop 205, contacts 243, through the lower winding of relay 210 to ground on contacts 202 of the release magnet. Relay 210 operates and closes contacts 212 to complete a circuit for slow-to-release relay 220 which operates to close contacts 222, 223, 224 and 225. Closing of contacts 225 retains ground over the C1 lead to hold the preceding switch. At contacts 224 a point in stepping circuits for the vertical and rotary magnets is prepared. At contacts 222 a circuit is completed from ground at contacts 275, contacts 222, rotary off-normal springs 201, vertical off-normal springs 203 to battery through the upper winding of slow-to-release relay 230 which operates to close contacts 231 and 234. Contacts 234 prepare a circuit to the vertical stepping magnet and the lower winding of relay 230.

On the first pulse of the first digit dialled into the connector, relay 210 releases to close contacts 211 to energize the vertical stepping magnet and the lower winding of relay 230 over contacts 224, 234, 258, the vertical magnet and battery through the lower winding of relay 230. As the connector is stepped in a vertical direction in accordance with the digit dialled V. O. N. springs 203 open to break the circuit to the upper winding of relay 230 and vertical off-normal springs 206 close to prepare a circuit to the release magnet while vertical off-normal springs 207 close to prepare a circuit to relay 250. At the end of the digit, relay 230 releases as contacts 211 remain open, to in turn close contacts 232 and complete a circuit for slow-to-release relay 250 from battery through relay 250 over springs 207, contacts 252, contacts 232, springs 201, contacts 222 to ground at contacts 275. Relay 250 operates and at contacts 258 prepares a stepping circuit to the rotary magnet. As contacts 251 close the previous operating circuit of relay 250 is opened at contacts 252 and a new circuit through springs 207, contacts 251, contacts 296 and contacts 223 is established. At contacts 253 it completes a circuit for the upper winding of relay 230 over the springs 201, contacts 222 to ground on contacts 275. At contacts 259 and 259' circuits are prepared to the upper and lower windings respectively of relay 295. At contacts 255 it prepares a point in the test circuit for the private wiper C2. Relay 230 operates to prepare a point in the stepping circuit for the rotary magnet at contacts 234 and at contacts 231 provides an alternate holding ground for relay 250 over contacts 251 and springs 207.

On the first pulse of the second digit dialled into the connector, contacts 211 again close to now energize the rotary magnet and the lower winding of relay 230 over contacts 224, 234, 257, and the rotary magnet to battery through the lower winding of relay 230. The wipers of the connector including wiper C2 are stepped a rotary direction to the bank contacts associated with the called line. As contacts 233 and 256 are open the potentials encountered by wiper C1 in passing over the bank contacts are ineffective to operate any equipment. As the connector is stepped in the rotary direction R. O. N. springs 201 open and rotary off-normal springs 208 close to complete a circuit from battery through the upper winding of relay 295 over contacts 259, springs 208, conductor 313 (commonly connected to all connectors), contacts 373, 351, 363, 375 to ground.

Relay 295 operates to close contacts 297, 298, 299, 294 and 298'. Opening of contacts 296 removes a ground from relay 250 while closing of contacts 297 provides another holding ground for relay 250 from contacts 353, 377, 297, 251 and springs 207. Closing of contacts 298 prepares a point in the circuit for connecting the private wiper C2 to the control grid of tube A'. Closing of contacts 298' completes a circuit from ground at contacts 371, through slow-to-release relay 360, contacts

341, 298', 259' to battery, through the lower winding of relay 295. Relay 360 operates to close contacts 361. Closing of contacts 299 is now effective to connect ground potential through the lower winding of relay 290 over contacts 361 to the anode of tube A'. Opening of contacts 299' breaks the chain through the preceding connectors and prevents the completion of a circuit to the lower windings of the corresponding relays in those connectors. The relays 295A, 295B, 295C and 295D corresponding to relay 295 and each either in a preceding connector or a succeeding connector cannot now be operated as relay 360 on operating opened contacts 363 to prevent the establishment of a circuit similar to that described for the upper winding of relay 295 from being established to the corresponding relays in other connectors. They may all be operated simultaneously however but only the connector closest to the detector and having a prepared chain will seize the detector as will be explained. Relay 360 on operating also closes contacts 364 to complete a circuit for biasing the cathode and grid M' of tube A'. Closing of contacts 362 completes a circuit to slow-to-operate relay 350 and differential relays 340 and 330 from ground at contacts 375 and contacts 362, to battery through relay 350; to contacts 343 and battery through the upper winding of relay 340 and to contacts 331 to battery through the lower windings of relays 330 and 340 respectively. Opening of contacts 363 of course breaks the circuit of the upper winding of relay 295 (whose lower winding now holds its contacts operated) and prevents negative battery time pulses through the upper winding of relay 320 from operating it. Opening of contacts 297' breaks the chain through succeeding connectors and prevents completion of a circuit to the lower winding of either 295 C or D in the event relay 340 is operated. Relay 340 is differential and as both windings are now energized it does not operate. Differential relay 330 operates, as only its lower winding is energized, to open its own operating circuit and the circuit to the lower winding of relay 340. However, it closes a new circuit for both over contacts 375 and 332.

Digressing for a moment it will be noted that release of relays 360 and 295 after release of relay 250 (as will be explained) causes relay 360 to open the circuit to the upper winding of relay 340 at contacts 362 and relay 340 operates to close contacts 342 and 344. At contacts 344 the chain is prepared to the succeeding connectors so that one of them may seize the detector. It will be noticed that the nearest connector in the chain will seize the detector first. At contacts 344 a circuit is prepared to the upper winding of relay 330 so that the next time the detector is seized or relay 360 operated to close contacts 362, relay 330 will have both windings energized and release to reestablish its first energizing circuit for its lower winding and the lower winding of relay 340 to maintain 340 operated. Then when the detector or relay 360 is again released to open the circuits for the relays 330 and 340, their operative status is returned to that discussed originally. This alternate action between relays 330 and 340 enables the preparation of either a preceding or succeeding groups of connectors to thus equalize accessibility of the detector to various connectors if several are waiting to seize the detector. It will also be noted that a detector routing check circuit to be explained is used and that relays 330 and 340 are continuously alternated in their operation to enable the completion of a routing test circuit through the chain through one group of connectors and then through another group of connectors. Thus the detector is alternately made available to members of both groups of connectors successively if none from another group is waiting to seize the detector.

Returning now, slow-to-operate relay 350 operates over contacts 375 and 362 to close contacts 352 to prepare a point in the circuit for connecting the private wiper C2 to the grid of tube A'. At contacts 353 it opens the previously described circuit for relay 250 which however is held operated both from contacts 231, 251 and springs 207.

At the end of the digit contacts 211 remain open and relay 230 releases as the circuit to its lower winding is open to close contacts 233 and apply the potential found by the private wiper C2 at its associated contact to the grid of tube A' over contacts 255, 233, 298, 374 and 352. Simultaneously, contacts 231 open to remove the holding ground from relay 250, however relay 250 is slow-to-release and does not release its contacts yet. As before explained for tube A, if ground, indicating a busy line circuit, is forwarded to the grid of tube A', the negative potential on the grid will be raised sufficiently for the tube to fire and the anode current over contacts 361, 372, 299 and the lower winding of relay 290 is sufficient to operate relay 290 which closes contacts 291 to apply busy tone over contacts 265 to the loop back to the calling party. At contacts 292 it opens a point in an incomplete circuit through the lower winding of relay 270. At contacts 293 a circuit is completed for the upper winding of relay 290 over contacts 222 and 275. Contacts 231 are open and therefore relay 250 restores to open the circuit to the lower winding of relay 295 at contacts 259' and disconnects the wiper C2 from the grid of tube A' when contacts 255 open. Relay 360 also releases after a period of time to allow the detector to be seized by another connector. The calling party on replacing his handset now opens the loop 205 and cause the switches to be released as will be explained.

In the event the called line is idle either 24 volt of 48 volt negative battery will be applied to the grid of tube A' when relay 230 releases and the tube will not fire. Relay 250 on releasing opens the circuit to the lower winding of relay 295 at contacts 259' and closes contacts 256 to forward negative battery from one side of the line cut-off relay in the called subscriber's circuit over the wiper C2 and contacts 256, 292, the lower winding of relay 270 to ground on contacts 223. The line cut-off relay operates to perform its respective functions while relay 270 operates to close contacts 274 to provide a direct holding ground for the line cut-off relay over contacts 292, 256 and wiper C2. A circuit is completed for the upper winding of relay 270 from ground at contacts 223, over contacts 276, contacts 267 shunting the lower winding of relay 260 to battery through the upper winding of relay 270. On closing of contacts 272 and 273 ringing current is applied through relay 260, contacts 261 and 272 to one side of the ringing loop to the called party and from contacts 263 and 273 to the other side of the loop and at contacts 271 ring back tone is sent back over the loop 205 to the calling party. On answer by the called party a D. C. loop is completed over the just described contacts and through relay 260 which operates to close contacts 262, 264 and 266 to extend and complete the called subscriber's loop to relay 240, while opening contacts 267 to complete the circuit for the upper winding of relay 270 through the lower winding of relay 260 so that it energizes and maintains relay 260 operated after the loop through the upper winding of relay 260 is opened at contacts 261 and 263. Ring back tone to the calling party is also removed at contacts 261. Relay 240 operates to close contacts 242 and 244 to reverse battery on loop 205 to provide answer supervision and the parties may now converse.

The detector, after the release of relay 295, is available for seizure by another connector. Relay 360 also released a short time after the circuit to the lower winding of relay 295 was opened to open contacts 361, 362 and 364 and close contacts 363. Contacts 362 open to release relay 350 and at contacts 364 the biasing circuit for the tube cathode is opened. Opening of contacts 362 of course opens the circuit for the upper winding of relay 340 and it now operates to prepare a circuit for the upper winding of relay 330 at contacts 344 and a chain at contacts 342 through the succeeding connector switches of the group to enable a waiting succeeding connector to have access to the detector.

Thus assuming that one of the succeeding connectors has been operated by digital impulses to a desired position and a relay corresponding to 230 has released at the end of the last digit. The connector is now waiting to seize the detector. A relay corresponding to relay 250 is held operated over contacts corresponding to 251, 296 and 225. Thus relay 250 if the connector is waiting to seize the detector is no longer under the control of relay 230. As soon as relay 360 is released by the testing connector, contacts 362 open to deenergize the upper winding of relay 340 and it operates as before described. A circuit is simultaneously completed from the upper winding of relay 295C (for example) over contacts and springs corresponding to 259 and 208 respectively, conductor 313, contacts 373, 351, 363 and 375. Relay 295C operates to close and open contacts corresponding to those operated by relay 295. A circuit is then completed from ground at contacts 371, through relay 360, contacts 342, contacts corresponding to 298' and 259' to battery through the lower winding of relay 295C.

Relay 295C on operating completes a previously described holding circuit at contacts corresponding to 297 for a relay corresponding to relay 250 while opening its first circuit at contacts corresponding to 296. Slow-to-operate relay 350 opens this holding circuit after a few moments at contacts 353 however as relay 250 is slow-to-release sufficient time is available for the detector to perform its before described test operations.

Release of the relay corresponding to 250 of course opens the circuits to both windings of relay 295C and the circuit to relay 260. Relay 350 which was operated as previously described now releases. Relay 330 which released as both windings were energized stays released as both windings are now deenergized. Relay 340 releases as both windings are deenergized to prepare the chain through the group of preceding connectors. It is to be noted that although the upper windings of all relays corresponding to relay 295 may be operated simultaneously only the first one to complete the circuit to the lower winding of a relay corresponding to 295 may seize the detector and this is determined by which chain is prepared by relay 340.

During the period when the detector is idle and no connectors are waiting to seize it, negative time pulses of —48 volts sent at definite intervals through the upper winding of relay 320, contacts 351, 363 (as relay 360 is restored) to ground at contacts 375 to energize the upper winding of relay 320. It closes contacts 322 and 324 to complete a circuit from battery through the relay 310, the lower winding of relay 320, contacts 381 and then either over contacts 324 and 297' and the chain of corresponding contacts of relay 295C and D, contacts 342 (closed only if relay 340 is operated), through relay 360, contacts 371 to ground to test the chain through the succeeding connectors or if relay 340 is unoperated over contacts 322, contacts of relays 295A and B corresponding to contacts 299' and contacts 299', contacts 341, through relay 360, contacts 371 to ground to test the chain through the preceding connectors to operate relay 310 and the lower winding of relay 320 in either event. Relay 320 also closed contacts 326, 323, 329 and 329'. The operating ground for normally operated relay 370 at contacts 376 is transferred to the time cut-off ground pulse through resistance 327. This ground is of slightly longer duration than the negative battery pulse. If relay 310 does not operate because of an open chain, etc.; relay 370 (normally operated over contacts 376 and 328) is designed to release shortly because of resistance 327 to transfer the connectors to an alternate detector circuit (not shown).

Relay 310 and the lower winding of relay 320 operate if everything is in order and relay 310 closes contacts 311 to apply a direct ground to relay 370 to maintain it fully operated while the upper winding of relay 320 deenergizes after a moment as the negative pulse has already been removed. Relay 360 also operates as the circuit for relay 310 is completed through it to in turn close contacts 361, 362 and 364. Closing of contacts 329 and 329′ close a circuit for raising the grid potential of tube A′ across resistors 317 and 317′. Anode potential for tube A′ is furnished from ground through relay 380, contacts 323 and 361 so that tube A′ conducts and relay 380 operates to open contacts 381 and release relays 310, 320 and 360 which in turn open the circuits for tube A′ and relay 380 at contacts 323 and 364 to thus extinguish tube A′ and release relay 380. The previously described circuits for operating relays 330 and 340 are completed alternately as previously pointed out, each time relay 360 operates to in turn shift the routing check circuit each time. Thus the detector is made available to both preceding and succeeding connectors in turn. Relay 320 also opens contacts 326 to restore ground at contacts 328 and 376 to relay 370.

Release of the connection by the calling party, if he received busy tone indicating the called line is busy, is accomplished by replacing his handset to open the loop 205 to relay 210 and it releases to open the circuit to relay 220. A previously described circuit may be temporarily completed to the lower winding of relay 230 however it will open as relay 220 releases. Release of relay 220 closes contacts 221 to complete a circuit from ground at contacts 275, contacts 221, springs 206 to battery through the release magnet. The release magnet operates to return the connector to normal and open springs 206, 207 and 208 and close springs 201 and 203. Contacts 209 are closed to ground the C1 lead to hold the preceding switch as contacts 225 open when relay 220 released. Springs 206 on opening open the circuit to the release magnet. Relay 290 is released on opening of contacts 222. The release magnet on releasing removes ground from the C1 lead to release the preceding switch.

If the call is completed relays 210, 220, 240, 260 and 270 are operated. Release of the connection by the called party opens the loop to relay 240 which releases to restore battery to normal on the loop 205. The calling party on releasing the connection opens the loop to relay 210 which releases to restore relay 220 and complete a circuit to the release magnet as described. Opening of contacts 223 opens the circuit through the upper and lower windings of relay 270 and the lower winding of relay 260 and they release. Opening of contacts 274 removes ground from the line cut-off relay of the called party. The release magnet restores the switch as previously described.

The operation of the third modification of the present invention as applied to a P. B. X trunk hunting connector will be illustrated with the type of connector considered in the first modification with the exception that a fourth wiper denoted as an EC wiper is used. Only such circuits as are pertinent to the third modification are shown while equipment similar to the first modification if shown will be designated by *a″* following the number. In a P. B. X system a called number may often be assigned to a group of consecutive trunks on the same level. Therefore after the digits are dialled into the connector and it has been operated in accordance therewith, the circuits of the connector are arranged to step the connector along the bank contacts of the desired group of consecutive trunks to hunt for an idle trunk. Such contacts may occupy a complete level of the bank, however here for the purposes of illustration contacts 1—4 and 9 and 10 are each individual to a particular called line and contacts 5—8 representing a group of common trunks are all on the same level. The line relay and relay 420″ may be considered as operated in the manner previously described for relays 10 and 20. Relay 420″ closes contacts 428 and 429.

Dialling of the first digit steps the connector 401 as previously described for connector 100. Dialling of the second digit operates relay 410″ (corresponding to relay 110) and the rotary magnet to step the connector in a rotary direction and they both release at the end of the digit. Slow-to-release relay 410″ closes contacts 468 to complete a circuit over contacts 473 to operate slow-to-release relay 415 which closes contacts 417—420. Contacts 418 close to prepare a circuit from the EC wiper and ocntacts 419 and 420 complete a circuit for supplying ground potential to the anode of tube A″ through the lower winding of relay 480″ and a circuit for biasing the cathode of tube A″.

Assuming that the number dialled resulted in stepping the connector wipers to any one of the individual contacts 1–4, 9 and 10, a busy test is performed similar to that described in the first modification. The bank contacts associated with the EC wiper are open and no circuits will be completed over them. Relay 410″ corresponding to relay 110 is operated on the dialling of the last digit to open contacts 466 to prevent completion of any circuits by the C3 wiper as it steps over its associated contacts and at contacts 468 completes a circuit over contacts 473 to slow release relay 415. At the end of the digit, slow-to-release relay 410″ restores to close contacts 466 and as slow-to-release relay 415 has not yet released, ground or negative battery depending on whether the called line is busy or idle is forwarded from wiper C3 over contacts 466 and 417 to the grid of tube A″. Tube A″ fires if ground is forwarded and energizes the lower winding of relay 480 through contacts 419 and rotary interrupter springs 402 and it operates to close contacts 481, 483 and 484 and open contacts 482 to open a point in an incomplete circuit to the wiper switching relay 490″. Relay 415 releases shortly to close contacts 416 and open the tube circuits at contacts 419 and 420 so that it extinguishes. At contacts 481 busy tone is sent back over contacts 477′ and the line to the calling party. A circuit for the upper winding of relay 480 is completed from ground at contacts 428, 483, 476 to battery through the upper winding of relay 480 and it energizes to hold the contacts of 480 as the circuit to the lower winding of relay 480 is opened at contacts 419 when relay 415 releases. Now when the calling subscriber replaces his handset to open the loop to the line relay it releases to in turn open the circuit to relay 420″ which releases to open contacts 428 and release the upper winding of relay 480 while the connector 400 is returned to normal in a manner similar to that described for the connector in the first modification.

If negative potential indicating an idle line is found by wiper C3, tube A″ does not fire and relay 480 is not operated. Relay 415 releases shortly after relay 410″ to complete a circuit through the wiper switching relay 490″ (corresponding to relay 90 in Fig. 1), which operates in a manner similar to relay 90. The connection is completed and later released in a manner similar to that described for the first modification.

Assuming now that the dialled number has stepped the wipers of connector 400 to contact 5. The connector is now in position to test a group of consecutive trunks for the purpose of finding an idle one. The first trunk in the group of consecutive trunks has ground connected to the bank contact 5 associated with the EC wiper while the last contact 8 has —48 volt battery connected thereto. Slow-to-release relay 415 is operated as before described on the operation of relay 410″ to in turn prepare tube A″ for operation. On release of relay 410″ at the end of the digit the tube tests for the busy or idle condition of the trunk associated with contact 5 of the C3 wiper. Simultaneously, ground is forwarded from contact 5 and the EC wiper associated therewith over contacts 467, 418, 479 to battery through the upper winding of relay 475. Relay 475 operates to close contacts 477, 478, 474 and 472 and opens contacts 476 to prevent completion of a circuit to the upper winding of relay 480. It also opens contacts 479 and 473 and opens the busy tone circuit at contacts 477′. If the trunk is busy tube A″ fires to energize the lower winding of relay 480 as before described. Relay 480 closes contacts 484 to energize the rotary magnet over contacts 472 and hold relay 415 operated over contacts 472 and 474. The rotary magnet opens the rotary interrupter springs 402 to release relay 480. As relay 480 releases to open the circuit to the rotary magnet at contacts 484, it deenergizes to advance the connector wipers to the next contact.

The lower winding of relay 475 energized over contacts 478, 429 and 499 and is maintained energized as switching relay 490″ is unoperated. Relay 475 also opens its first operating circuit at contacts 479. Relay 415 receiving an energizing spurt as described and being slow-to-release maintains its contacts operated while the connector wipers are stepped to contacts 6. The tube circuit is opened when rotary interrupter springs 402 opened and are closed again to apply ground potential to the tube anode on deenergization of the rotary magnet. Contact 6 associated with the EC wiper forward no potential. If ground indicating a busy trunk is forwarded from contact 6 associated with the C3 wiper to the grid of tube A″, it will fire to energize the lower winding of relay 480 which again closes contacts 484 to maintain relay 415 operated and energize the rotary magnet. The rotary magnet opens the springs 402 to deenergize relay 480 and itself in turn as described and advance the connector wipers. Busy tone is not returned while relay 475 maintains contacts 477′ open. If the trunk associated with contacts 7 is busy the wipers are advanced to contacts 8 where negative potential is forwarded from the EC wiper over contacts 467, 418, the lower winding of relay 475 to ground at contacts 477 to energize the upper winding of relay 475. As relay 475 is differential it releases very quickly to open the energizing circuit to relay 415 at 474 and the rotary magnet circuit at contacts 472. Rotary make springs 401 are provided for fully energizing the rotary magnet to take its final step from contacts 7 to 8 as relay 475 releases very rapidly and the rotary magnet may therefore not be fully energized before contacts 472 open. If ground is returned over the C3 wiper to operate the tube and the lower winding of relay 480, busy tone is now returned over contacts 481 and 477′ to the calling party while the upper winding of relay 480 is energized over its previously described circuit. The rotary magnet will not be energized or contacts 402 opened as contacts 472 are open. Relay 415 releases after a period of time to extinguish the tube and the lower winding of relay 480 is deenergized. The switch may then be released as previously described.

If negative battery is found by wiper C3 on any of the contacts associated therewith, tube A″ will not fire nor is relay 480 operated. Therefore when relay 415 releases to close contacts 416 negative battery is forwarded through the wiper switching relay 490″ and it operates to enable the completion of the connection as described in the first modification. Relay 475 may operate when ground on contact 5 is found by the EC wiper however it serves no purpose as the rotary magnet and relays 480 and 415 cannot then be energized as relay 480 is unoperated. Switching relay 490″ on operating opens contacts 499 to open the circuit to the upper winding of relay 475 and it releases. A circuit to its lower winding cannot be established now as relay 415 has already released. Release of the switch on termination of the conversation occurs in a manner already discussed.

I have described several embodiments of my invention but do not wish to limit myself thereto.

What I claim is:

1. A test arrangement for a connector switch including a switching relay for said connector switch and a stepping magnet for setting said connector switch on a called line, comprising an electronic tube circuit, means in said connector operated when said stepping magnet has set said connector on a called line for connecting said tube circuit to said called line, said tube circuit responsive to any one of a number of predetermined different negative potentials for enabling a circuit to be completed to said switching relay to thereby enable said connector to complete a connection to said called line, and means energized in response to said tube circuit being connected to any one of a number of predetermined different positive potentials for preventing the operation of said switching relay and the completion of a connection to said called line by said connector.

2. A test arrangement for a group of connectors each having a switching relay and a stepping magnet operated responsive to digital impulses for setting its associated connector on a called line, comprising an electronic test circuit, means in each of said connectors operated if its associated connector stepping magnet is operated and if said test circuit is idle for associating said test circuit with said connector, means in each of said connectors thereafter operated when its associated stepping magnet has set its associated connector on a called line responsive to digital impulses for connecting said test circuit to said called line, said electronic test circuit thereafter energized if said called line is busy for preventing said connector from completing a connection to said called line, and means in each of said connectors operated if said electronic test circuit is unenergized on connection to said called line for enabling said connector to complete a connection to said called line.

3. In a test arrangement such as claimed in claim 2, a chain circuit extending to each connector, means operated by said chain circuit if said means for associating said test circuit with a connector is operated to prevent operation of means corresponding to said last means in another connector.

4. A test arrangement such as claimed in claim 3 in which a first chain circuit extends through a first plurality of connectors of said group and another chain circuit extends through another plurality of connectors of said group, means associated with one of said chain circuits operated on association of said test circuit with a connector of said first plurality for enabling said other chain circuit and associating itself therewith to enable association of said test circuit with a connector of said second plurality, said means thereafter operated if a connector of said other plurality is associated with said test circuit for enabling the chain circuit to said first group of connectors and associating itself therewith to enable the association of one of said first group of connectors with said test circuit.

5. In a connector switch having line and test wipers and means for moving the wipers into connection with the terminals of any one of a number of called subscriber lines, a test circuit including said test wiper, an electronic device included in said test circuit, means for operating said first means to move the wipers into connection with the terminals of a desired line and for thereby completing said test circuit, the test terminal of one of said called lines having one negative potential thereon if its associated line is idle and one positive potential thereon if its associated line is busy, the test terminal of another called line having another negative potential thereon if the associated line is idle and another positive potential thereon if the associated line is busy, means for completing a connection over the line wipers to the called line, said device effective when the test wiper engages a test terminal having any of said negative potentials thereon to operate said last means to complete a connection to the called line and effective when said test wiper engages a test terminal having any of said positive potentials connected thereto to prevent the operation of said last means to thereby prevent the completion of a connection to a tested called line.

6. A test circuit for a connector switch comprising an electronic tube, a filament circuit for said tube, means completed if said connector is seized for completing said filament circuit to thereby enable said tube to become conductive, means operated responsive to electrical impulses received by said connector for stepping said connector to a corresponding position and for connecting said tube to said position for causing said tube to become conductive if certain predetermined potentials are connected to said position, means operated if said tube is conductive for preventing said connector from completing a connection to said position, means operated if other predetermined potentials connected to said position prevent conduction of said tube to thereby enable said connector to establish a connection to said position, and another filament circuit completed to said tube before operation of said first means for warming said tube to a predetermined temperature, said other filament circuit opened on operation of said first means to thereby enable the completion of a filament circuit similar to said other filament circuit to another tube in another connector.

7. A test arrangement for a group of connector switches, each connector switch including a switching relay and a stepping magnet for setting its associated connector on a called line and means associated with each connector operated responsive to seizure of its associated connector switch comprising a plurality of electronic tubes, each individually associated with one connector of said group, a filament circuit for each of said tubes completed by said operated means when its associated connector is seized for enabling its associated tube to be rendered conductive, means in each of said connectors operated when its stepping magnet has set its associated connector on a called line for connecting its associated tube to said called line, said tube rendered conductive if said line is busy for preventing operation of said switching relay, a circuit completed to said switching relay if said tube circuit is unenergized for enabling the completion of a connection to said called line by said connector switch, and another filament circuit completed on operation of said first means for prewarming the tube associated with another connector of said group to a predetermined temperature.

8. A test system for a group of connector switches each having a switching relay and a stepping magnet for setting its associated connector on a called line, comprising an electronic tube circuit, a first chain circuit extending to a first plurality of connectors of said group, a second chain circuit extending to a second plurality of connectors of said group, a double wound relay in each connector, a circuit completed to one winding of a double wound relay of a connector if said connector stepping magnet has been operated and said test circuit is idle to operate said relay to thereby open the chain circuit through the particular plurality of connectors with which it is associated and complete a circuit for energizing its other winding through part of said chain circuit while opening the chain circuit through the other plurality of connectors, means operated on completion of said circuit to said other winding for preparing said electronic tube circuit and for opening said circuit to said one winding, means in each connector operated if its associated connector is associated with said tube circuit for connecting said tube circuit to a called line, means thereafter operated by said tube circuit if said line is busy for preventing said connector from establishing a connection to said line, said last means ineffective if said called line is idle to thereby enable said connector to establish a connection to said called line, means effective after said tube circuit has been connected to a called line for disconnecting said tube circuit from said called line and opening said circuit to said other winding and restoring said means operated thereby, and other means operated on restoration of said last means to associate said last means with the chain circuit and enable the chain circuit extending to said other plurality of connectors to thereby enable one of said other connectors to be associated with said tube circuit, said other means thereafter operated for enabling said first chain circuit.

9. A test system for a connector switch including a switching relay and a stepping magnet operated responsive to electrical impulses for setting a connector on a called line which is either busy or idle, comprising an electronic tube circuit, means operated in response to the operation of said stepping magnet for connecting said tube circuit over said control conductor to said called line, said tube circuit energized in response to said called line being busy, means operated in response to the energization of said tube circuit for preventing operation of said switching relay, a circuit completed over said control conduction to said switching relay in response to said tube circuit being unenergized indicating said called line is idle for enabling the completion of a connection to said called line by said connector switch, and means operated in response to said stepping magnet being operated by a predetermined number of impulses for automatically stepping said connector to another predetermined line in response to said first line being busy and said tube circuit energized.

10. A test system for a group of connector switches each including a switching relay and a stepping magnet operated responsive to electrical impulses for setting its associated connector on a called line, comprising an electronic tube circuit, means operated for associating said test circuit with a particular connector, said last means comprising alternate chain circuits each extending to a different plurality of connectors of said group, means operated if said stepping magnet is operated for connecting said tube circuit to the called line said particular connector is set on, means operated if said connector is associated with one plurality of connectors for enabling the chain circuit to said other plurality of connectors to thereby enable one of said other plurality of connectors to be associated to said tube circuit, and means operated for alternately completing said chain circuits if said tube circuit is idle for testing the condition of said chain circuits and for making said tube circuit alternately available to each plurality of connectors.

11. For use with a connector switch in a telephone system of the class wherein a called position is indicated as idle by one of a plurality of different potentials the improvement comprising an electronic test circuit associated with said connector switch and connected over a control conductor to said called position responsive to said connector switch being associated with said called position, said test circuit conditioned in one manner by any one of said plurality of different potentials transmitted thereto over said control conductor, and means operated in response to said test circuit being conditioned in said one manner for enabling said connector switch to complete a call to said position.

12. A test arrangement for use with a connector switch having access to a plurality of called positions each of which is indicated as idle by an individually corresponding condition and is indicated as busy by another individually corresponding condition comprising an electronic tube circuit associated with said connector switch and connected to a called position when its associated connector switch is connected thereto, said tube circuit conditioned in response to any one of said first individually corresponding conditions for enabling said connector switch to complete a call through said called position, and means operated in response to said tube circuit being conditioned by any one of said other individually corresponding conditions for preventing said connector switch from completing a call through said called position.

13. For use with a connector switch in a telephone system of the class wherein a called position is indicated as idle by one of a plurality of different potentials and which is indicated as busy by one of another plurality of different potentials, the improvement comprising an electronic test circuit associated with said connector switch and responsive in one manner to any one of said first plurality of different potentials and responsive in another manner to any one of said other plurality of different potentials, means operated if said test circuit responds in said one manner when it is connected to a called position by said connector switch for enabling said connector switch to complete a call through said called position, and means operated if said test circuit responds in said other manner for preventing said connector switch from completing a call through said position.

References Cited in the file of this patent

UNITED STATES PATENTS

| | | |
|---|---|---|
| 1,903,837 | Richardson | Apr. 18, 1933 |
| 2,315,705 | Holden et al. | Apr. 6, 1943 |
| 2,409,145 | Morris | Oct. 8, 1946 |